United States Patent

[11] 3,623,824

| [72] | Inventors | Geoffrey Light Wilde;<br>Donald Eyre, both of Derby, England |
|---|---|---|
| [21] | Appl. No. | 844,086 |
| [22] | Filed | July 23, 1969 |
| [45] | Patented | Nov. 30, 1971 |
| [73] | Assignee | Rolls-Royce Limited<br>Derby, England |
| [32] | Priority | Aug. 5, 1968 |
| [33] |  | Great Britain |
| [31] |  | 37,309/68 |

[54] GAS TURBINE POWER PLANT
5 Claims, 2 Drawing Figs.

[52] U.S. Cl............................................. 416/21,
416/20, 60/226, 60/39.15
[51] Int. Cl...................................... F02c 7/02,
F02k 3/02
[50] Field of Search........................... 244/17.11,
67; 416/20, 21, 22, 171; 60/226, 39.15

[56] References Cited
UNITED STATES PATENTS

| 3,505,816 | 4/1970 | Wilde ........................ | 60/226 |
| 1,955,921 | 4/1934 | Kusse ........................ | 244/17.11 |
| 2,689,615 | 9/1954 | Fletcher ..................... | 416/21 |
| 3,288,225 | 11/1966 | Flint et al.................... | 416/90 |

FOREIGN PATENTS

| 756,050 | 8/1956 | England ...................... | 416/20 |
| 856,975 | 12/1960 | England ...................... | 416/20 |
| 938,459 | 10/1963 | England ...................... | 416/20 |

Primary Examiner—Martin P. Schwadron
Assistant Examiner—Clemens Schimikowski
Attorney—Cushman, Darby & Cushman ABSTRACT: A gas turbine power plant, especially for a helicopter, has two gas turbine gas generators arranged back-to-back on a common axis, each gas turbine gas generator being located in a main flow duct which also houses a free radial-flow turbine in flow series with the gas generator. A fan duct coaxially surrounds the main flow duct and houses two centrifugal flow fan rotor stages drivingly connected to the free turbine. The fan exhaust drives turbofans mounted at the tips of hollow arms of a rotor which is also provided with rotary bladed arms.

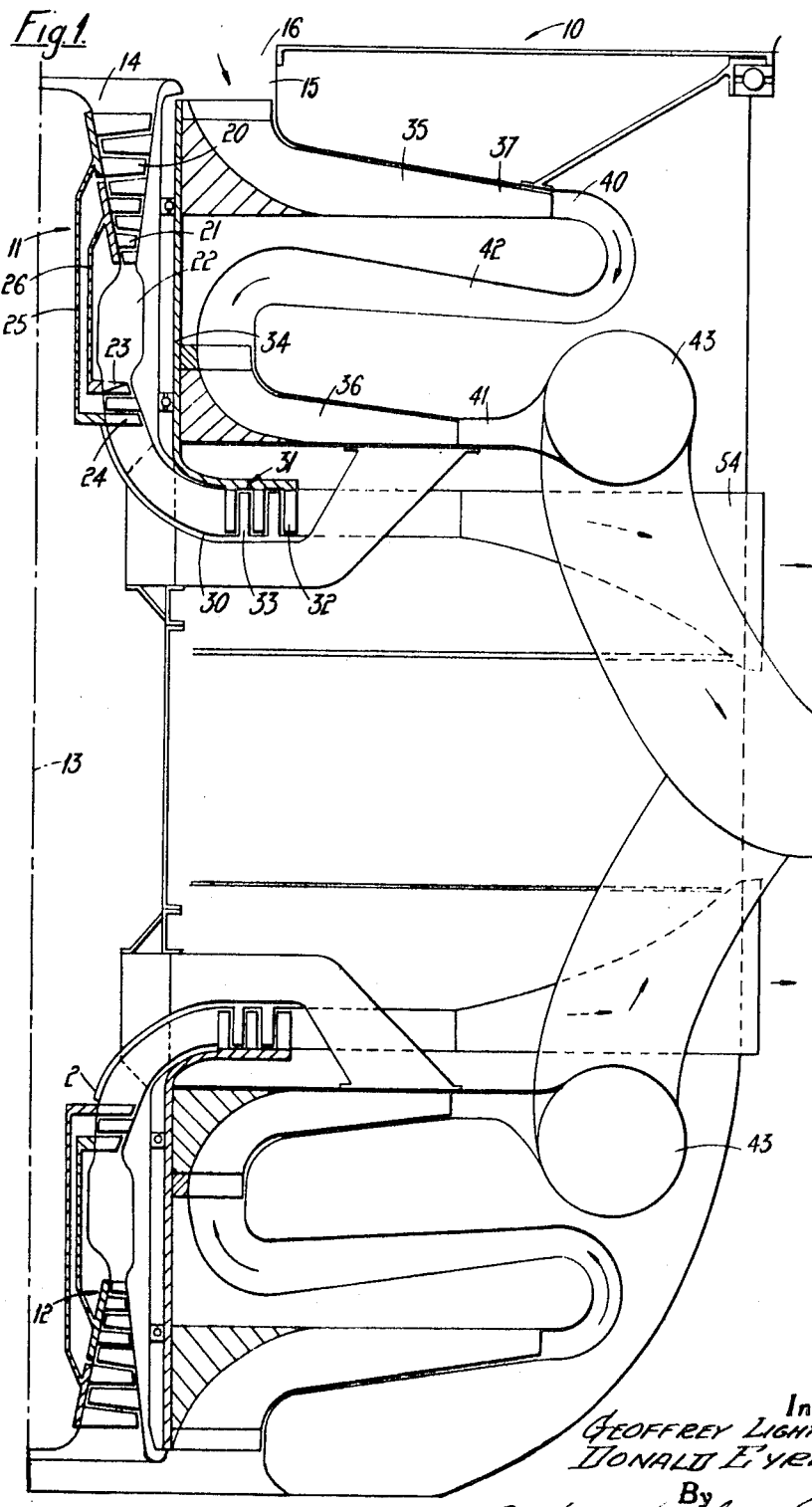

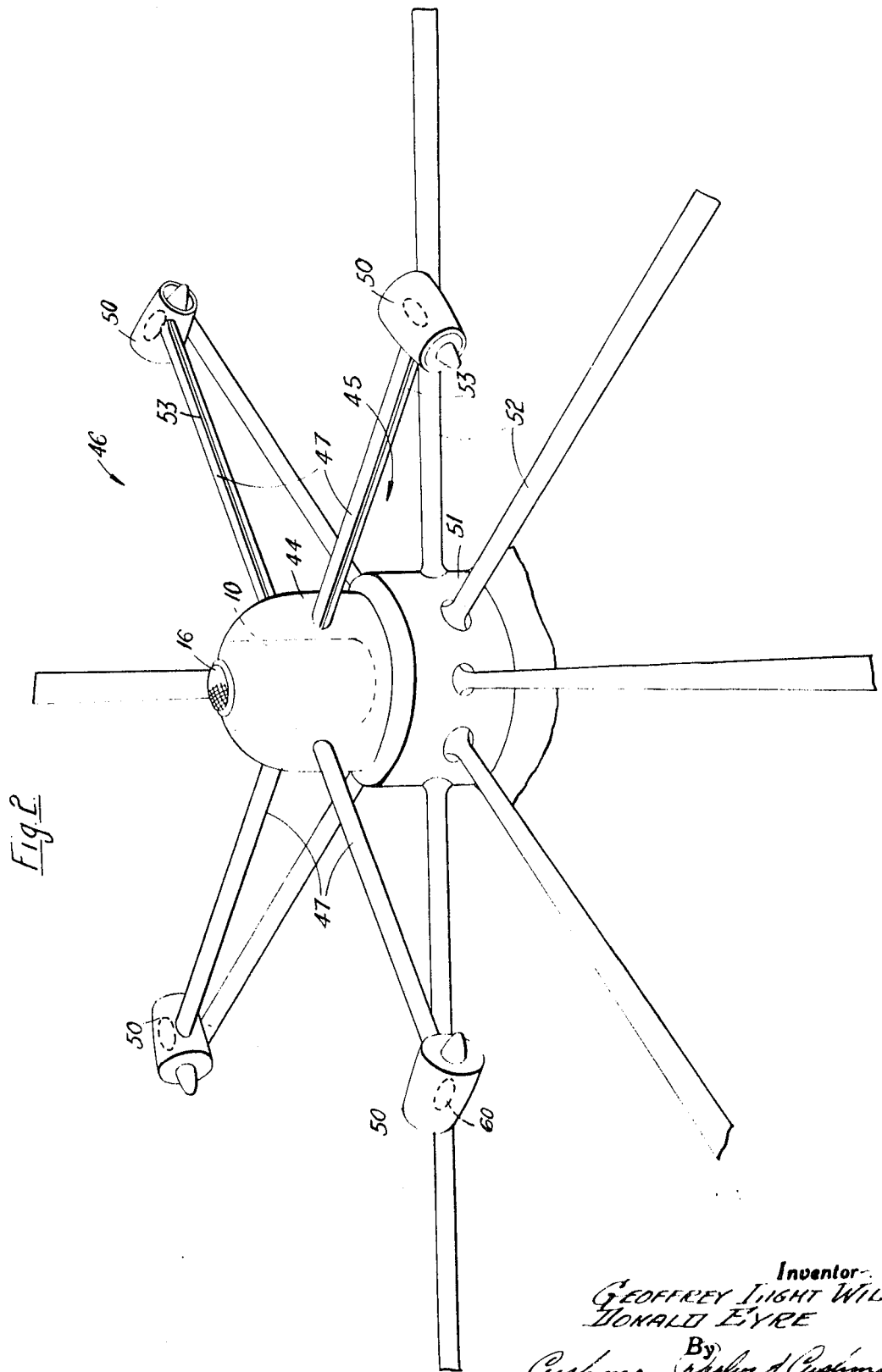

GAS TURBINE POWER PLANT

This invention, which concerns gas turbine power plant, and rotary wing aircraft such as helicopters which are provided with such gas turbine power plant, is an improvement in, or modification of, the invention of our copending cognate British Patent Applications Nos. 16872/67 and 27752/67.

According to the present invention, a rotary wing aircraft is provided a gas turbine power plant comprising two gas turbine gas generators which are arranged back-to-back on a common axis, each said gas generator having a main flow duct in which is located turbine means adapted to be driven by exhaust gases from the respective gas generator, each said turbine means having at least one radial-flow rotor stage, and a fan duct which is disposed radially outwardly of, and coaxially with, each main flow duct and in which is located a fan, each said fan having at least one centrifugal-flow rotor stage drivingly connected to the respective said at least one radial-flow rotor stage. The power plant is arranged to supply compressed air to turbofan engines carried at the tips of a rotor of the aircraft.

Each fan has two said centrifugal-flow rotor stages, each fan duct having a portion which extends radially inwardly from the first to the second of the centrifugal-flow rotor stages.

Each gas generator and its respective fan have a common air intake.

The invention also comprises a rotary wing aircraft, e.g. a helicopter, provided with a power plant, as set forth above.

The helicopter has a rotor having angularly spaced-apart reaction arms at the top of each of which is mounted a turbofan engine, each said fan being arranged to supply compressed air to at least one respective turbofan engine, the turbofan engine being arranged in operation to rotate the rotor.

Moreover, each turbofan engine may be provided with combustion equipment to augment the thrust therefrom without substantially increasing the mean velocity of the jet efflux therefrom.

Each reaction arm may be provided with at least one slot through which a part of the said compressed air passes out to effect boundary layer control.

The rotor may also be provided with a plurality of angularly spaced-apart blades which extend radially outwardly of the reaction arms.

The invention is illustrated, merely by way of example, in the accompanying drawings, in which:

FIG. 1 is a sectional view through part of a gas turbine power plant according to the present invention, and FIG. 2 is a perspective view of a helicopter which is provided with a power plant of FIG. 1.

In FIG. 1 there is shown a gas turbine power plant 10 which comprises two gas turbine gas generators 11, 12, which are arranged back-to-back on a common axis 13. The gas generators 11, 12, are of identical construction and in order to simplify the description, only the gas generator 11 will be described in detail, it being understood that the gas generator 12 has similar parts.

The gas generator 11 has a main flow duct 14 and a fan duct 15, the fan duct 15 being disposed radially outwardly of, and coaxially with, the main flow duct 14. The main flow duct 14 and the fan duct 15 have a common air intake 16.

The gas generator 11 comprises in axial flow series a two-state low-pressure compressor 20, a two-stage high-pressure compressor 21, combustion equipment 22, a single-stage high-pressure turbine 23, and a single-stage low-pressure turbine 24. The low-pressure compressor 20 and the low-pressure turbine 24 are drivingly connected by a shaft 25. The high-pressure compressor 21 and the high-pressure turbine 23 are drivingly connected by a shaft 26 which is concentric with and disposed radially outwardly of, the shaft 25.

Downstream of the turbines 23, 234 the main flow duct 14 has a radially outwardly turned section 30. Mounted in the section 30 is a three-stage radial-flow turbine 31. The radial-flow turbine 31 has rotor blades 32, which are adapted to be driven by exhaust gases which have passed through the turbines 23, 24, and stator blades 33 which are secured to fixed structure.

The rotor blades 32 of the radial-flow turbine 31 are mounted on an end portion of a shaft 34 whose main portion is disposed coaxially of the shafts 25, 26. The shaft 34 drives first and second centrifugal-flow rotor stages 35, 36 of a fan 37 which is mounted in the fan duct 15. The centrifugal-flow rotor stages 35, 36 direct the air flowing through the fan duct 15 through radially outwardly extending portions 40, 41, respectively of the fan duct 15, the fan duct 15 having a portion 42 which extends radially inwardly from the first centrifugal-flow rotor stage 35 to the second centrifugal-flow rotor stage 36.

The portion 41 of the fan duct 15 ducts the fan exhaust air to an annular manifold 43.

The power plant 10 is mounted within a housing 44 which forms part of a rotor 45 of a helicopter 46. The housing 44 is provided with four equiangularly spaced-apart hollow reaction arms 47 at the tip of each of which is mounted a turbofan gas turbine engine 50. The annular mainfold 43 of each of the fans 37 supplies compressed air to the hollow interiors of two of the reaction arms 47 and so to two of the turbofans fans engines 50. The jet effluxes from the four turbofan engines 50 serve to rotate the rotor 45 and hence to rotate a portion 51 thereof which is mounted below the housing 44 and which is provided with a plurality of angularly spaced-apart blades 52. The blades 52 extend radially outwardly of the reaction arms 47, the radial length of the latter being, for example, only half that of the blades 52.

If desired, each of the turbofan engines 50 may be provided with combustion equipment shown in outline at 60 to augment the thrust therefrom without substantially increasing efflux by mean velocity of the jet efflux by increasing the density of the jet efflux therefrom.

Each of the reaction arms 47 is provided with one or more slots 53 through which a part of the compressed air which is supplied to the reaction arms 47 may pass out to atmosphere so as to effect boundary layer control and thus achieve lift.

The turbine exhaust gases which have passed through each of the radial flow turbines 31 are ducted to a volute 54 (FIG. 1) from which they are downwardly directed to atmosphere so as to provide some lift. Additionally, or alternatively, the turbine exhaust gases may be utilized for assisting forward propulsion or attitude control.

The helicopter described above is particularly adapted for use as a heavy weight lifting crane which is intended only for very low speed flight.

We claim:

1. A rotary wing aircraft having:
  a gas turbine power plant comprising two gas turbine gas generators which have a common axis, said gas generators being arranged back-to-back on said common axis, and each said gas generator having a main flow duct, turbine means located in said main flow duct and adapted to be driven by exhaust gases from a respective gas generator, with each said turbine means having at least one radial-flow rotor stage, and a fan duct which is disposed radially outwardly of, and coaxially with, each main flow duct, and a fan located in each said fan duct, each of said fans having two centrifugal-flow rotor stages drivingly connected to said at least one radial-flow rotor stage, and each fan duct having a portion which extends radially inwardly from a first to a second of said centrifugal-flow rotor stages, and each of said gas generators and its respective fan having a common air intake,
  a rotor,
  angularly spaced-apart driving arms connected to said rotor, each of said arms having a tip with a turbofan engine mounted at the tip, and
  each of said fans of said gas turbine power plant being arranged to supply compressed air to at least one associated turbofan engine of the rotor, with the turbofan engines being arranged to rotate the rotor in operation.

2. An aircraft as claimed in claim 1 in which the aircraft is a helicopter.

3. An aircraft as claimed in claim 1 in which each turbofan engine is provided with combustion equipment to augment the thrust therefrom without substantially increasing the mean velocity of the jet efflux therefrom.

4. An aircraft as claimed in claim 1 in which each driving arm has at least one slot defined therein through which a part of the said compressed air passes out to effect boundary layer control.

5. An aircraft as claimed in claim 1 in which a plurality of angularly spaced-apart blades are provided on the rotor, which blades extend radially outwardly of the driving arms.

* * * * *